United States Patent [19]

Wood

[11] Patent Number: 4,608,738

[45] Date of Patent: Sep. 2, 1986

[54] METHOD AND APPARATUS FOR REMOVING SPINDLES AND NEEDLE BEARINGS

[76] Inventor: Thomas H. Wood, 1700 West 2700 North #69, Ogden, Utah 84601

[21] Appl. No.: 585,545

[22] Filed: Mar. 2, 1984

[51] Int. Cl.[4] .............................................. B23P 19/04

[52] U.S. Cl. ...................................................... 29/264

[58] Field of Search .......................... 29/256, 258-259, 29/261-265, 275

[56] References Cited

U.S. PATENT DOCUMENTS

| | | | |
|---|---|---|---|
| 1,364,489 | 1/1921 | Edelblut | 29/275 |
| 1,449,763 | 3/1923 | Knapp | 29/275 |
| 1,642,285 | 9/1927 | Woodward | 29/264 |
| 1,658,896 | 2/1928 | Hays | 29/264 |
| 3,340,593 | 9/1967 | Savastano | 29/262 |

OTHER PUBLICATIONS

Spicer-Axle Supplement-Jul. 1980-p. 18, Ford Motor Co.

Spicer-Maintenance Manual-p. 8, Dana Corporation.

*Primary Examiner*—Frederick R. Schmidt
*Assistant Examiner*—Steven P. Schad
*Attorney, Agent, or Firm*—Trask, Britt & Rossa

[57] ABSTRACT

A tool for removing the wheel spindle from a four-wheel drive vehicle and extracting the needle bearings housed within that spindle is disclosed. The tool includes a mounting platform adapted to be mounted on the spindle, a platform retained plunging shaft dimensioned to be inserted into the hollow spindle so as to apply a disjoining compressive force to the wheel axle, and a bearing pushing assembly made collapsibly insertable into the detached spindle. The bearing pusher is adapted to interact with a driving means to forcibly push the bearings from their retaining well.

15 Claims, 5 Drawing Figures

METHOD AND APPARATUS FOR REMOVING SPINDLES AND NEEDLE BEARINGS

BACKGROUND OF THE INVENTION

1. Field:

The instant invention concerns the removal of the spindle and bearings from the wheel assembly of a vehicle. Specifically, the invention is directed to the spindle and bearings of a four-wheel drive vehicle.

2. State of the Art:

The current construction of front wheel assemblies of domestically manufactured trucks, or other vehicles having similar spindle assemblies, makes requisite the frequent servicing of the needle bearings or bushings housed within the assembly's wheel spindle. Present practice dictates the replacement of the bearings or bushings. In that the servicing of either component is substantially the same, hereinafter the mentioning of bearings also includes a corresponding reference to bushings. Oftimes, the spindle is so securely bonded to its mounting knuckle by corrosion that extreme measures must be pursued to remove the spindle so as to allow servicing of the bearings. Conventional practice includes the use of impact implements such as rawhide or 3–4 pound copper drift hammers, or alternatively, cutting torches, to loosen the spindle. Reference is made to page 8 of *Spicer Axle Maintenance Manual Model* 44 *Front & Rear Carrier,* as published by Spicer Axle Division of the Dana Corporation, Fort Wayne, Ind., as describing a typical approach of the current practice. Severe cases often require the use of chisels to separate the bonded parts. Not only do such efforts prove to be extremely time-consuming (such removals routinely may take two hours time), but moreover, the configuration of the spindle itself complicates the process. Furthermore, such procedures result in extensive damage being rendered to the spindle, bearings and attendant structure thereof.

The conventional spindle retains a flat mounting platform secured perpendicularly to a hollow shank extension. An exploded view of a typical spindle assembly is shown on page 18 of the catalog entitled *Spicer XS-F Index No.* 094 *Axle Supplies* dated July 1980. The shank extends outwardly from its mounting while being adapted to receive within its interior the axle of the vehicle. An annular lip member extending into the mounting surface of the steering knuckle prevents spindle displacement in the plane of the mounting. The construction of the mounting anticipates a disjoining force being applied perpendicular to the plane of the mounting surface. Under normal conditions, assuming no corrosive bonding of the spindle to its attendant knuckle, the spindle may be removed by grasping the spindle shank and exerting an outwardly directed force perpendicular to the spindle's mounting plane. In situations where corrosive bonding has occurred and extensive force application is required the spindle shape fails to present an impact surface for such a perpendicularly applied force being generated by impact tools such as hammers or chisels. Instead, such an impact force is generally applied at a point removed from the mounting itself but still generally in the plane of the mounting. The resulting force applications attempt to achieve a rocking motion of the spindle which supposedly breaks the seal of the corrosive bonding. As may be observed, often this procedure proves laborious in that the spindle lip opposes such a rocking motion, as well as obstructs the entrance of a chisel into the mounting. Therefore, the excessive force required to defeat the lip's reaction often results in the fracture of the spindle, damage to the threads on the spindle's shank or binding of the spindle which results in damage being rendered to the bearings housed within the spindle.

Alternate apparatus germane to spindle removal are indicated by U.S. Pat. Nos. 1,367,744 (Jacob); 1,310,154 (Cantrell et al); 3,748,718 (Russell) and 1,001,644 (Hutchings).

Upon the removal of the spindle from its knuckle, conventional practice dictates the use of a slide hammer to remove the needle bearings from the spindle housing. This procedure generally involves the insertion of jaw-like members into the spindle and the generation of a forcible pulling action directed against the shell sidewall embracing the bearings. It must be remembered that the bearing shell is so thin that attempts to grasp the shell and pull it out inevitably prove unsuccessful. Generally the shell wall is ruptured in such attempts, effectually destroying the bearings.

Conventional alternatives to slide hammers include chisels and cutting torches. As can be appreciated, the bearings are oftentimes damaged beyond repair by such means necessitating the total replacement thereof.

Patents directed to bearing removing apparatus include U.S. Pat. Nos. 1,831,003 (Holland); 2,618,053 (Claps); and 4,027,664 (Zoula). These apparatus exhibit a commonality in relying on a plunger shaft effecting a pulling action, as opposed to a pushing action, to extract the subject bearings from their mounting well.

SUMMARY OF THE INVENTION

An apparatus and method for removing the wheel spindle from a four-wheel drive vehicle as well as subsequently extracting the needle bearings from that spindle have been invented. The instant apparatus may function as an integrated unit or alternately may be viewed as a kit assembly of functional implements.

The main structural component of the apparatus is a tubular element having internal threads adapted to form a manually detachable union with the threads extant on the shank of the subject wheel spindle. This element serves as a mounting means for appurtenant structure.

Secured within the tubular element is a retarding means adapted to receive the threaded insertion of a shaft-like plunging member. The retaining means generally may be a socket-like housing exhibiting internally disposed threads adapted to intercooperate with those of the plunging element.

The shaft-like plunging element generally may present one end configured as an abutment surface. This surface is adapted to interface with the wheel axle permitting the transferal of a compressive force against that axle by the continued threaded insertion of the plunging element into the retaining means. The alternate end of the plunging element is adapted for translating power from an external power source into a rotating thread insertion of the plunging element.

A pushing means is dimensioned so as to be slidably inserted into the detached wheel spindle. Generally, the pushing means is structured to resiliently expand within the interior of the spindle, after having passed beyond the position of the needle bearings. This expansion permits the pushing means to abut against the bearing casing. After such passage, the direction of travel of the pushing means is reversed by a driving means. The resulting forced displacement pushes the bearings from their mounting well subsequently ejecting them from the spindle interior. The driving means may either be provided by the same structure described for removing the spindle or alternately a conventional means such as an impact wrench or hammer. The use of the described spindle removing structure as a driving means permits a rapid operation in that the two operations are generally executed one after another. The bearing removal function thereby benefits from the prior mounting of the spindle removing structure.

DETAILED DESCRIPTION OF THE ILLUSTRATED EMBODIMENT

The preferred embodiment of the instant invention illustrated in FIGS. 1–4 is specifically directed for use with the Spicer Model Nos. 30, 44, 44IFS, 50IFS and 60 four-wheel drive, front axle assemblies and other assemblies of similar configuration. These assemblies are those commonly utilized in U.S. manufactured one-half, three-quarter, and one ton four-wheel drive trucks.

Figure 1:
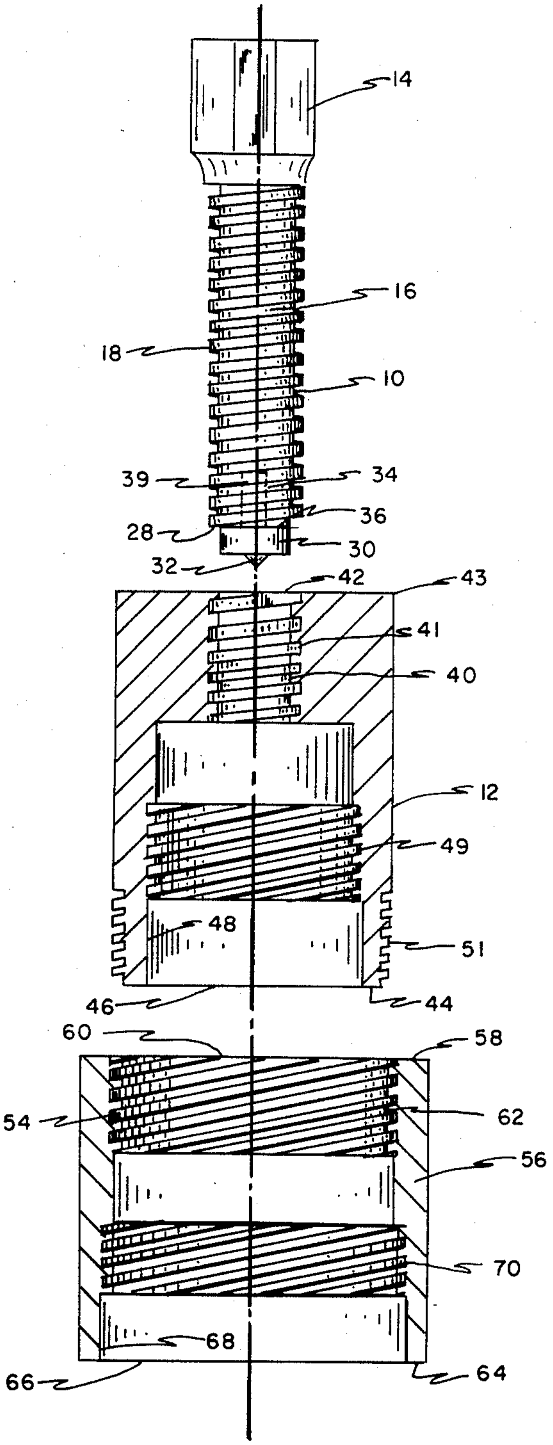
FIG. 1 is an exploded cross-sectional view of the wheel spindle puller of the instant invention. The shaft member is shown having a hexagonally configured head.

FIG. 1 shows an approximately cylindrical shaft member, generally 10, detachably removed from a tubular housing structure, generally 12. The shaft 10 includes at its proximal end a head extension 14 adapted to intercooperate with a power supply driving means (not shown). As shown, the head extension 14 is configured in a hexagonal fashion permitting its use with either a manually employed wrench or alternately a powered impact wrench (not shown).

Figure 2:
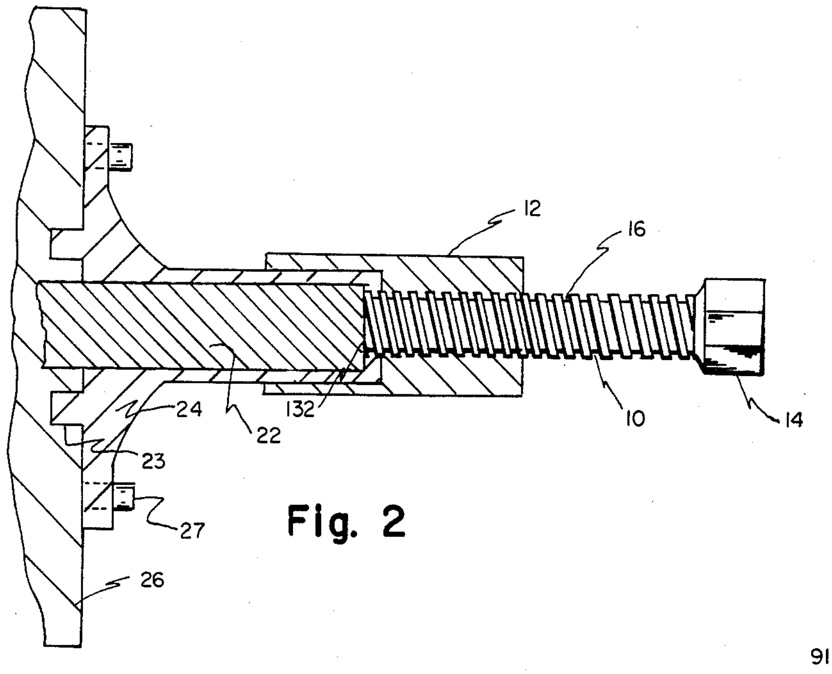
FIG. 2 is a side cross-sectional view of the spindle puller threaded onto an axle mounted wheel spindle.

Secured to the head extension 14 is a generally cylindrical shaft section 16 exhibiting a plurality of axial threads 18. The threads 18 generally extend over the length of the shaft section 16 and retain a constant diameter. The diameter chosen may vary, though a preferred diameter is approximately one inch. As shown in FIG. 2, the shaft section's 16 length must be dimensioned sufficiently to be inserted into housing 12, abut against axle shaft 22 and still retain additional length, permitting a translation of torque into a compressive force directed longitudinally against the axle 22 so as to dislodge the annular lipped 23 spindle 24 from its mounting knuckle 26. The retaining nuts (not shown) have already been removed from mounting bolts 27. As a result, the length of shaft section 16 may vary in accordance with the specific spindle-axle assembly and housing involved. One preferred construction obtains a threaded sectional shaft length of approximately six inches. Mounted on the distal end 28 of shaft 10 is a rotatably mounted end extension 30. This end extension 30 may be generally cylindrically configured having a diameter smaller than that of the contiguous shaft section 16. The end extension may exhibit a protuberance 32 structured to properly seat the extension 30 against an abutting surface, thereby functioning to properly align the two abutting surfaces.

The end extension 30 may be rotatably mounted on the shaft 10 so as to minimize the transmission of torque from the shaft 10 to the axle 22. This rotary action may be obtained by a variety of configurations. One preferred embodiment contemplates the securement of a plug-like shaft 34 depended from extension surface 36 which is positioned so as to abut against the shaft surface 28. The shaft section 16 contains a recess well 39 adapted into its end surface to slidably receive and rotatably embrace the plug-like shaft 34. As shown, the plug-like shaft 34 is a cylindrical shaft mounted coaxially with the shaft section 16.

The hollow housing 12 is generally adapted for receiving the threaded shaft 10 by the dependence of an internal axial threaded socket 40, the threads 41 being configured to intercooperate with the threads 18 of shaft 10 to form a manually detachable union. The threads 41 are made accessible from the exterior of housing 12 by means of an intercommunicating access opening 42 mounted in the proximal end 43 of housing 12. The distal end 44 of housing 12 presents an opening 46 which also accesses the hollow interior of the housing 12. Extending from the opening 46 into the interior of the housing 12 is a smooth walled cylindrical recess well 48. The well 48 is adapted dimensionally to receive the threaded socket section 50 of spindle 24 and is of a length sufficient to properly align the section 50 so as to prevent cross threading upon the section's 50 intercooperation with a plurality of axially oriented internal threads 49 which are disposed contiguous to well 48 within the interior of housing 12 (see FIG. 4). A preferred embodiment utilizes an approximately tubular housing having an inner diameter of approximately $1\frac{5}{8}$ inches.

Housing 12 is adapted on its exterior surface with a plurality of axial exterior male threads 51. Threads 51 are dimensioned to intercooperate with a plurality of female axial threads 54 mounted on the interior of a housing member 56.

Housing member 56 is a hollow, generally tubular, member having at its proximal end 58 an access opening 60 adapted to communicate with the interior of member 56 together with the axial threaded socket 62 depended therein.

The distal end 64 of member 56 presents an access opening 66 which communicates with a smooth walled recess well 68 and its contiguous axial threaded socket 70. The recess well 68 is adapted similarly to that of housing 12, i.e., so as to properly align an incoming threaded spindle from cross threading the interior housed socket 70.

Housing member 56 is adapted to be manually united to housing 12 so as to allow the spindle puller a functional capability of adapting to two disparately sized axial threaded spindles. Dimensionally, member 56 preferably obtains a length of $2\frac{1}{4}$ inches having an inner diameter of 1-15/16 inches over threads 62.

Figure 4:
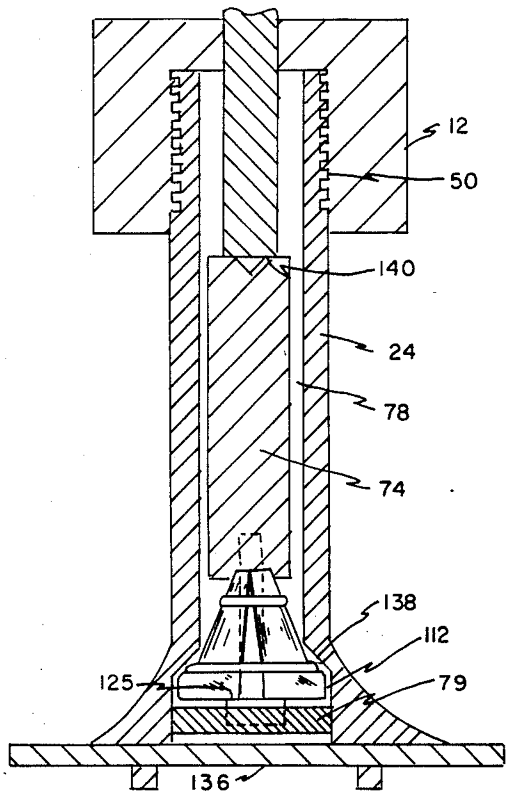
FIG. 4 is a side cross-sectional view of a bearing pusher of this invention mounted within a detached wheel spindle. The subject bearing is shown in narrow cross-hatching. The wheel spindle puller is shown as being retained on the spindle and thus providing the driving means for the bearing pusher.
Figure 3:
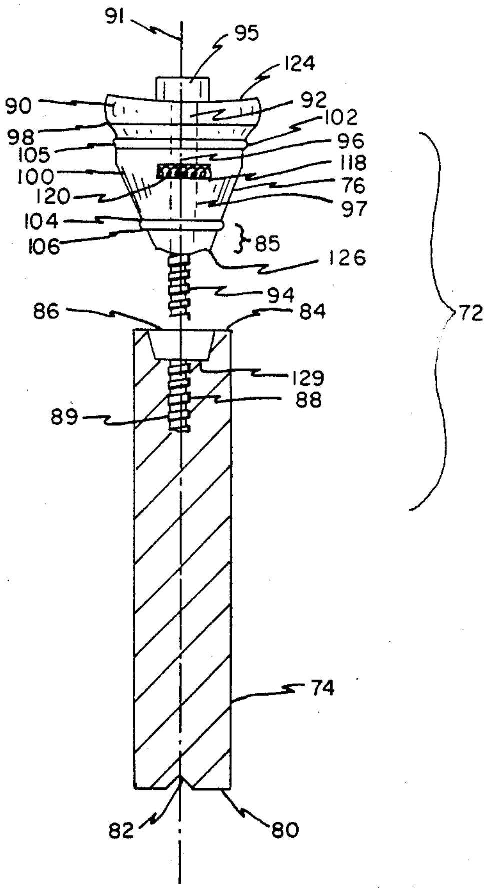
FIG. 3 is a vertical cross-sectional view of a bearing pusher of the instant invention. Internally mounted portions of the bolt member are shown in dotted lines.
Figure 5:
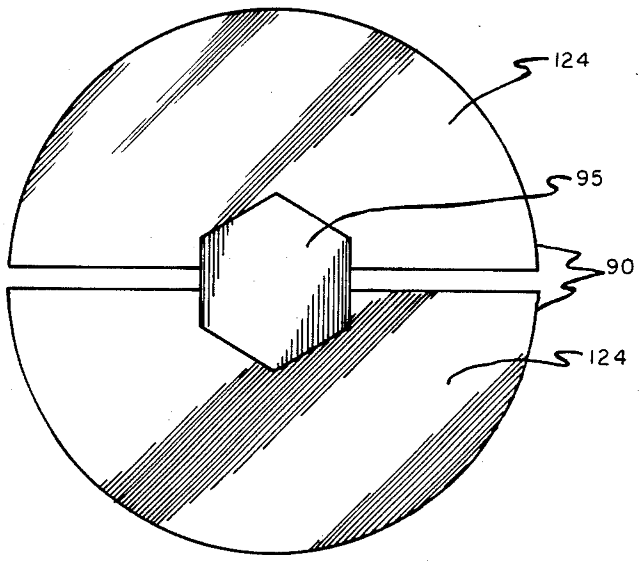
FIG. 5 is a top view of the bearing pusher shown in FIG. 4.

FIGS. 3 and 4 illustrate a bearing pusher, generally 72, adapted to be intercooperable with the spindle pulling assembly. The pusher includes a shaft member 74 and its attendant pushing head member, generally 76.

The shaft 74 is generally cylindrical in shape although alternate configurations may be used. The shaft is dimensioned so as to be slidably receivable and rotatably embraced by the hollow interior 78 of the wheel spindle 24. Preferably, the shaft maintains a diameter of approximately 15/16 inch over a length of approximately 5½ inches. The length is selected so as to enable a driving means (not shown) to intercooperate with the shaft when it, together with its attendant pushing head 76, abuts against the bearings 79 within the subject spindle 24.

The proximal end 80 of shaft 74 is adapted with a countersunk impression 82 configured to intercooperate with the protuberance 32 on the end extension 30 of shaft 10. The shaft's distal end 84 contains a tapered, circular cross-sectional, centrally disposed recess well 86 adapted to receive and embrace the portion 85 of pushing head 76. Recess well 86 accesses a second recess well 88 which being longitudinally oriented presents internal axial threads 89.

The pushing head 76 includes a plurality of segmented members 90 each having an arcuately-shaped exterior assembled around the longitudinal axis 91 of a bolt-like shaft member 92. The shaft 92 is axially threaded 94 so as to intercooperate with threads 89 formed in recess well 88. The shaft 92 also includes a conventional polygonal-sided head extension 95. The assembled segmented members 90 possess parallel interior walls 96 which serve to define a longitudinal axial channel 97 dimensioned to receive and embrace the bolt member 92. The exterior of the members 90 present a configuration defining a shoulder portion 98, a tapered shank 100 and two circumferentially placed channels 102, 104 adapted to receive resilient members 105, 106.

The shoulder 98 is dimensioned to be accommodated within the interior portion 112 of the wheel spindle 24. Of special importance is the width of the shoulder in view of the narrow spatial confines of the spindle interior. Preferably, the shoulder measures approximately 7/32 inch in width.

The shank of bolt member 92 defines a transversely oriented channel 118 which extends through the full diameter of the bolt's shank. The channel 118 houses a spring member 120, which is transversely mounted with respect to the bolt's longitudinal axis 91. The spring is dimensioned so as to produce an outwardly directed force against the segmented members against which it abuts.

A force reactive to that generated by the action of the spring member 120 is provided by resilient members 105, 106 housed within channels 102, 104. These members are preferably "O"-shaped cross-sectional rings fabricated from a resilient, elastic material such as rubber.

The top surface 124 defined by the assembly of segmented members presents a somewhat circular planar surface of sufficient area to abut against head extension 95 when the segmented members are fully extended in their expanded position, as shown in FIG. 4. Preferably the surface 124 is beveled on the portions thereof continguous to the channel 97. This beveling removes surface material near the surface areas proximate the interior wall defined by axial channel 97. The bevel permits an essentially planar resting surface 125 for the bolt head when the pushing member is fully extended.

The distal end surfaces 126 may also be beveled to promote a smooth expansion of the segmented members 90. The beveling removes material on the circumferential edges of the segmented members 90 resulting in a modified "U"-shaped profile. This configuration results in the segmented members being forcefully directed to outwardly expanded positions as the pushing head assembly 76 being threaded into union with its attendant shaft 74 is brought into abutment with the end surface 129 of that shaft 74. The beveled surfaces operate to direct compressive forces nonaxially so as to force the expansion of pushing members 90.

In the operation of removing the wheel spindle 24, the spindle puller housing 12 is first threaded onto the spindle shaft threads 50 utilizing threads 49 or 70. The driving shaft 10 is then inserted into housing 12 by intercooperating threads 18 and 41. The shaft continues its inward motion until its inner end 132 contacts the counterbored axle 22. Generally, driving shaft 10 is powered from its outward end by using a hand, or alternately, an impact wrench (not shown). After contact, an increasing torque application to the shaft, generally up to approximately 130 ft/lbs results in the spindle 24 being dislodged from its mounting. In that no lateral force has been applied to the spindle, the detrimental effects of such a force application, i.e., spindle fracture, bearing damage, damaged threads, are avoided while yet achieving the same desired result of removing the spindle.

The dislodged spindle 24 then receives the bearing pusher 72. The pusher 72 is directed into the spindle's interior 78 by means of the access opening 136 which formerly embraced the axle 22. The shaft portion 74 of the pusher is inserted first, the collapsible expanding pushing head 76 following thereafter. The pushing head collapses in diameter permitting the head's passage beyond the bearing ring 79. The shoulder 98 subsequently is restrained from further penetration by its abutment against the inclined interior wall 138 of spindle 24. The spindle pulling mechanism having remained in position now permits the driving shaft 10 to be further inserted, contacting the pushing mechanism on its surface 140. Additional driving shaft 10 penetration results in the bearing ring 79 being pushed outwardly through the access opening 136. The expansive pushing head surface 124 functions to disseminate the force applied over a maximized area on the bearing ring thereby lessening the probabilities of bearing deformation. Alternatively the bearing pusher may employ another power source means to substitute for that rendered by the spindle puller driving shaft, e.g., hammers, wrenches. These alternate power source means may require an increase in the length of shaft member 74 such that upon abutment of surface 124 with the needle bearings 79, a portion of shaft 74 extends beyond the spindle 24. This construction permits a less obstructed access to the shaft 74 for purposes of applying a force thereto.

Subsequent to the bearing's removal, the pushing mechanism is slidably retracted from the spindle. The spindle puller is detached by reversing the threaded motion used to attach it.

I claim:

1. A device for removing the threaded hollow wheel spindle and extracting the needle bearings from the wheel-axle assembly of a four-wheel drive vehicle, said device comprising:

a mounting means adapted to form a manually releasable union with said threaded wheel spindle, said mounting means possessing an axial threaded retaining means;

an axial threaded driving means maintained within said retaining means being adapted to be threadedly inserted into said retaining means producing thereby a force applied against said wheel axle whereby said wheel spindle is forcibly removed from said wheel-axle assembly as a result of said force application; and a pushing means having a planar, substantially circular abutment surface adapted to be inserted within said wheel spindle after said removal of said spindle from said wheel-axle assembly, said pushing means being positionable in three conditions, a first condition wherein a diameter of said pushing means is larger than a diameter of a centrally located aperture within said needle bearings, a second condition wherein said pushing means is collapsed in diameter such that said pushing means diameter is smaller than said central aperture diameter of said needle bearings whereby said pushing means may pass through said needle bearing aperture, and a third condition wherein said pushing means diameter is larger than said needle bearing aperture, yet smaller than an inner diameter of that portion of said wheel spindle proximate said needle bearing, said pushing means diameter being expanded upon said passage of said pushing means through said needle bearing aperture whereby said circular, planar, abutment surface of said pushing means is abutted against said needle bearings, said pushing means being made intercooperable with said driving means whereby said driving means effects a displacement of said pushing means and operates to push said pushing means out of said wheel spindle, thereby ejecting said needle bearings from within said spindle.

2. The device according to claim 1 wherein said mounting means comprises a hollow tubular housing possessing interior mounted axial threads of dimensions adapted to intercooperate with the threads of said wheel spindle to form a manually releasable union.

3. The device according to claim 1 wherein said retaining means comprises an axial threaded socket member depended from said mounting means.

4. The device according to claim 3 wherein said driving means comprises an axially threaded power shaft adapted to form a threaded connection with said threaded socket member permitting a threaded insertion of said power shaft through said socket member.

5. The device according to claim 1 wherein said pushing means comprises:

a smooth shaft member adapted to be driven by said power shaft; and a resilient pushing head having a substantially circular abutment face mounted on said shaft member adapted to be collapsed in diameter and slidably inserted into the interior of said wheel spindle through an aperture in said needle bearing and further slid beyond the positioning of said needle bearing and then expanded within said interior such that said abutment face is contiguous with said casing sidewalls of said needle bearings.

6. A device for removing an axial threaded hollow wheel spindle from the axle assembly of a vehicle and extracting annular needle bearings from said spindle, said device comprising:

a first hollow tubular member dimensioned to receive said threaded wheel spindle, said tubular member having a first axially threaded socket portion depended therein, said first socket portion being dimensioned to intercooperate with said threaded wheel spindle to form a manually releasable union, said tubular member having a second axially threaded socket portion depended therein;

an axial threaded drivable first shaft member adapted to intercooperate with said second socket portion so as to permit a manually adjustable threaded union of said first shaft member with said second socket portion whereby the threaded advancement of said shaft member into said second socket portion applies a compressive force against said axle, whereby said wheel spindle is forcibly removed from said axle assembly, said first shaft member's advancement being controlled by an intercooperating power supply means;

a second shaft member dimensioned to be slidably received within the interior of said wheel spindle after said wheel spindle's removal from said axle assembly, said second shaft member having an abutment surface which contacts said first shaft member, said second shaft member being driven and displaced by the threaded advancement of said first shaft member into said second socket portion;

a bolt member having attachment means adapted to permit a releasable union of said bolt member with said second shaft member, said bolt member having a head-like extension;

a plurality of pushing members symmetrically arranged around the longitudinal axis of said bolt member;

a resilient spring-like member mounted on said bolt member and oriented so as to exert a force on said pushing members, said force being directed essentially outwardly from the longitudinal axis of said bolt member; and at least one resilient restraining means, said resilient restraining means being accommodated within said pushing members whereby said pushing members are forcibly, yet resiliently, retained against said bolt member;

whereby a displacement of said second shaft member by said first shaft member effects an abutment of said pushing members against said needle bearings, a further displacement of said second shaft member effecting an ejectment of said needle bearings from within said wheel spindle.

7. The device of claim 6 wherein said resilient means comprises an "O"-shaped cross-section ring fabricated from an elastic material.

8. The device of claim 7 wherein said power supply means is a conventional impact wrench.

9. The device of claim 6 wherein said first tubular member includes a set of externally disposed axial threads mounted thereon, and wherein a second tubular member having a first set of internally disposed axial threads adapted to intercooperate with said set of externally disposed threads of said first tubular member is detachably mounted on said first tubular member and wherein said second tubular member includes a second set of internally disposed threads, said second set of internally disposed threads are adapted to be releasably mounted on a threaded spindle of a four-wheel drive vehicle, whereby said device is made adaptable to more than one size of threaded spindle.

10. A device for removing two differently sized axial threaded hollow wheel spindles from the axle assembly of a four-wheel drive vehicle and extracting the needle bearings from said spindle, said device comprising:

a first hollow tubular member dimensioned to receive a first threaded wheel spindle, said first tubular member having axial male threads on the outer circumference thereof;

a second hollow tubular member having a first set of interior mounted female threads dimensioned to intercooperate and form a union with a second threaded wheel spindle, said second tubular member having a second set of interior mounted axial female threads depended therein adapted to receive and intercooperate with said male threads on the outer circumference of said first tubular member, whereby said second tubular member is detachably mounted on said first tubular member whereby said device is adapted for mounting on wheel spindles of disparate sizes;

a first recess well, depended within said second tubular member, having an inner diameter dimensioned to receive said second threaded wheel spindle and align the longitudinal axis of said wheel spindle with the longitudinal axis of said first set of interior mounted female threads whereby said second wheel spindle may be threaded into said first set of interior threads without cross threading;

a first axially threaded socket portion depended within said first tubular member, said first socket portion being dimensioned to intercooperate with said first threaded wheel spindle to form a manually releasable union;

a second recess well depended within said first tubular member having an inner diameter dimensioned to receive said first axial threaded wheel spindle, and align the longitudinal axis of said spindle with the axis of said first threaded socket, whereby said spindle may be threaded into said first threaded socket without cross threading;

a second axially threaded socket portion depended within said first tubular member;

an axial threaded drivable first shaft member adapted to intercooperate with said second socket portion so as to permit a manually adjustable threaded union of said first shaft member with said second socket portion whereby the threaded advancement of said first shaft member into said second socket portion abuts a rotatably mounted shaft extension, mounted on said first shaft member, against said axle whereby said abutment transfers a compressive force against said axle;

a smooth second shaft member dimensioned to be slidably received within the interior of said first and second wheel spindles, said second shaft member having an abutment surface which contacts said first shaft member, said second shaft member possessing a counterbored third recess well, said second shaft member being driven and displaced by the threaded action of said first shaft member;

an axial threaded socket extension depended within said second shaft member contiguous to and accessed by said counterbored third recess well;

a bolt member having axial threads adapted to form a manually releasable union with said socket extension, said bolt member having a head-like extension;

a plurality of pushing members symmetrically arranged around the longitudinal axis of said bolt member, said pushing members having parallel interior surfaces which define a longitudinal channel along the interior of said pushing members, said channel embracing said bolt member, each of said pushing members having an arcuately shaped exterior surface, a tapered shank portion possessing at least one spaced outer surface circumferential channel therein, first beveled abutment surface which acts against said head-like extension of said bolt member, and a second beveled abutment surface which abuts against said counterbored third recess well;

a spring member mounted within a housing channel disposed transversely within said bolt member, said housing channel intercommunicating the diametrically opposed exteriors of said bolt member, whereby said spring member having a length in excess of said housing channel is permitted to exert a force against said pushing member, said force being directed radially from the longitudinal axis of said bolt member; and at least one resilient means, said resilient means being dimensioned to be accommodated within said outer surface channel of said pushing members whereby said pushing members are forcibly, but resiliently, retained against said bolt member.

11. An apparatus for removing an axial threaded hollow wheel spindle from the steering knuckle and axle of a four-wheel drive vehicle and extracting the needle bearings from within said spindle, said apparatus comprising:

a wheel spindle remover comprising:

a hollow tubular member dimensioned to receive said threaded spindle, said tubular member having a first axial threaded socket portion depended within said tubular member, said first socket portion being adapted to intercooperate with said threaded wheel spindle to form a manually releasable union, said tubular member having a second axial threaded socket portion depended therein, and an axially threaded drivable first shaft member made intercooperable with said second socket portion to permit a manually adjustable threaded union, whereby the threaded advancement of said shaft member into said second socket portion applies a compressive force to said axle resulting in said spindle being removed from said steering knuckle; and a needle bearing remover dimensioned to be slidably inserted within said wheel spindle after said spindle's removal from said steering knuckle, said bearing remover adapted to collapse in diameter to permit the remover to pass through a centrally located aperture in said needle bearings and after passing beyond said needle bearings said remover being adapted to expand in diameter so as to position an essentially circular, planar abutment surface against said needle bearings, said remover being mechanically cooperable with said first shaft member whereby a displacement of said first shaft member effects a displacement of said remover whereby said needle bearings are ejected from said wheel spindle, said remover comprising:

a smooth second shaft member dimensioned to be slidably received within the interior of said wheel spindle, said second shaft member possessing an abutment surface which contacts said power supply means and is displaced by the action of said first shaft member, said second shaft member having an axial threaded socket on one end of said second shaft member, a bolt member having axial threads adapted to form a manually releasable union with the threads of said socket portion, said bolt member having a head, the shank of said bolt member exhibiting a transversely disposed diameter length channel embracing an expanding member, and a plurality of resilient pushing members symmetrically arranged around the longitudinal axis of said bolt member, said pushing members being adapted to expand radially through the action of said expanding member to meet the interior surface of said wheel spindle, said pushing members being retained on said bolt member by the action of restraining means, said pushing members defining said substantially circular planar abutment surface.

12. The apparatus according to claim 11 wherein said pushing members have parallel interior surfaces which define an axial channel along the interior of said pushing members dimensioned to embrace said bolt member, each of said pushing members having:

an arcuately shaped exterior surface;

a tapered shank portion possessing at least one spaced exterior surface circumferential channel therein; and an abutment surface positioned to react against said bolt head so as to restrain said pushing member on said second shaft member;

wherein at least one resilient restraining means, being dimensioned to be accommodated respectively within said exterior surface channel, operates to force said pushing members against said bolt members; and wherein said expanding member is a spring.

13. A device for removing two differently sized axial threaded hollow wheel spindles from the axle assembly of a four-wheel drive vehicle and extracting the needle bearings from said spindle, said device comprising:

a first hollow tubular member having a first set of interior mounted threads adapted to receive and mechanically cooperate with a first threaded wheel spindle to form a manually releasable union, said first tubular member having a second set of axial threads on the outer circumference thereof, said first tubular member defining a first recess well therein having an inner diameter dimensioned to receive said first axial threaded wheel spindle, and align the longitudinal axis of said spindle with the axis of said first set of threads, whereby said spindle may be threaded into said first threads without cross-threading, said first tubular member having a first axially threaded socket portion depended within said first tubular member;

a second hollow tubular member having a third set of interior mounted threads dimensioned to intercooperate and form a union with a second threaded wheel spindle, said second tubular member having a fourth set of interior mounted axial threads depended therein adapted to receive and intercooperate with said second set of threads on the outer circumference of said first tubular member, whereby said second tubular member is detachably mounted on said first tubular member whereby said device is adapted for mounting on wheel spindles of disparate sizes, said second tubular member defining a second recess well therein having an inner diameter dimensioned to receive a threaded wheel spindle and align the longitudinal axis of said wheel spindle with the longitudinal axis of said third set of interior mounted threads whereby said second wheel spindle may be threaded into said third set of interior threads without cross-threading;

an axial threaded drivable first shaft member adapted to intercooperate with said first socket portion so as to permit a manually adjustable threaded union of said first shaft member with said first socket portion whereby the threaded advancement of said first shaft member into said first socket portion abuts a rotatably mounted shaft extension, mounted on said first shaft member, against said axle whereby said abutment trensfers a compressive force against said axle and thereby effects a removal of a wheel spindle from said axle assembly;

a smooth second shaft member dimensioned to be slidably received within the interior of said first and second wheel spindles, said second shaft member having an abutment surface which contacts said first shaft member, said second shaft member possessing a counterbored third recess well, said second shaft member being driven and displaced by a displacement of said first shaft member, said second shaft member having an axial threaded second socket portion depended within said second shaft member contiguous to and accessed by said counterbored third recess well;

a bolt member having axial threads adapted to form a manually releasable union with said second socket portion, said bolt member having a head-like extension;

a plurality of pushing members symmetrically arranged around the longitudinal axis of said bolt member, said pushing members having parallel interior surfaces which define a longitudinal channel along the interior of said pushing members, said channel embracing said bolt member, each of said pushing members having an arcuately-shaped exterior surface, a tapered shank portion possessing at least one spaced outer surface circumferential channel therein, a first beveled abutment surface which acts against said head-like extension of said bolt member, and a second beveled abutment surface which abuts against said counterbored third recess well;

a spring member mounted within a housing channel disposed transversely within said bolt member, said housing channel intercommunicating the diametrically opposed exteriors of said bolt member, wherein said spring member having a length in excess of said housing channel is permitted to exert a force against said pushing members, said force being directed outwardly from the longitudinal axis of said bolt member; and at least one resilient means, said resilient means being dimensioned to be accommodated within said outer surface channel of said pushing members whereby said pushing members are forcibly, but resiliently, retained against said bolt member;

whereby a displacement of said second shaft member by said first shaft member effects an abutment of said pushing members against said needle bearings, a further displacement of said second shaft member effecting an ejectment of said needle bearings from within said wheel spindle.

14. A device for removing two differently sized axial threaded hollow wheel spindles from the axle assembly of a four-wheel drive vehicle and extracting the needle bearings from said spindle, said device comprising:

a first hollow tubular member having a first set of interior mounted threads adapted to receive and mechanically cooperate with a first threaded wheel spindle to form a manually releasable union, said first tubular member defining a first recess well therein having an inner diameter dimensioned to receive said first axial threaded wheel spindle, and align the longitudinal axis of said spindle with the axis of said first set of threads, whereby said spindle may be threaded into said first threads without cross-threading, said first tubular member having a first axially threaded socket portion depended within said first tubular member;

a second hollow tubular member having a second set of interior mounted threads dimensioned to intercooperate and form a union with a second threaded wheel spindle, said second tubular member being mounted on said first tubular member whereby said device is adapted for mounting on wheel spindles of disparate sizes, said second tubular member defining a second recess well therein having an inner diameter dimensioned to receive a threaded wheel spindle and align the longitudinal axis of said wheel spindle with the longitudinal axis of said third set of interior mounted threads whereby said second wheel spindle may be threaded into said third set of interior threads without cross-threading;

an axial threaded drivable first shaft member adapted to intercooperate with said first socket portion so as to permit a manually adjustable threaded union of said first shaft member with said first socket portion whereby the threaded advancement of said first shaft member into said first socket portion abuts a rotatably mounted shaft extension, mounted on said first shaft member, against said axle whereby said abutment transfers a compressive force against said axle and thereby effects a removal of a wheel spindle from said axle assembly;

a smooth second shaft member dimensioned to be slidably received within the interior of said first and second wheel spindles, said second shaft member having an abutment surface which contacts said first shaft member, said second shaft member possessing a counterbored third recess well, said second shaft member being driven and displaced by a displacement of said first shaft member, said second shaft member having an axial threaded second socket portion depended within said second shaft member contiguous to and accessed by said counterbored third recess well;

a bolt member having axial threads adapted to form a manually releasable union with said second socket portion, said bolt member having a head-like extension;

a plurality of pushing members symmetrically arranged around the longitudinal axis of said bolt member, said pushing members having parallel interior surfaces which define a longitudinal channel along the interior of said pushing members, said channel embracing said bolt member, each of said pushing members having an arcuately-shaped exterior surface, a tapered shank portion possessing at least one spaced outer surface circumferential channel therein, a first beveled abutment surface which acts against said head-like extension of said bolt member, and a second beveled abutment surface which abuts against said counterbored third recess well;

a spring member mounted within a housing channel disposed transversely within said bolt member, said housing channel intercommunicating the diametrically opposed exteriors of said bolt member, wherein said spring member having a length in excess of said housing channel is permitted to exert a force against said pushing members, said force being directed outwardly from the longitudinal axis of said bolt member; and at least one resilient means, said resilient means being dimensioned to be accommodated within said outer surface channel of said pushing members whereby said pushing members are forcibly, but resiliently, retained against said bolt member;

whereby a displacement of said second shaft member by said first shaft member effects an abutment of said pushing members against said needle bearings, a further displacement of said second shaft member effecting an ejectment of said needle bearings from within said wheel spindle.

15. A device for removing two differently sized axial threaded hollow wheel spindles from the axle assembly of a four-wheel drive vehicle and extracting the needle bearings from said spindle, said device comprising:

a first hollow tubular member having a first set of interior mounted threads adapted to receive and mechanically cooperate with a first threaded wheel spindle to form a manually releasable union, said first tubular member having a first axially threaded socket portion depended within said first tubular member;

a second hollow tubular member having a second set of interior mounted threads dimensioned to intercooperate and form a union with a second threaded wheel spindle, said second tubular member being detachably mounted on said first tubular member whereby said device is adapted for mounting on wheel spindles of disparate sizes;

an axial threaded drivable first shaft member adapted to intercooperate with said first socket portion so as to permit a manually adjustable threaded union of said first shaft member with said first socket portion whereby the threaded advancement of said first shaft member into said first socket portion abuts a rotatably mounted shaft extension, mounted on said first shaft member, against said axle whereby said abutment transfers a compressive force against said axle and thereby effects a removal of a wheel spindle from said axle assembly;

a smooth second shaft member dimensioned to be slidably received within the interior of said first and second wheel spindles, said second shaft member having an abutment surface which contacts said first shaft member, said second shaft member possessing a counterbored third recess well, said second shaft member being driven and displaced by a displacement of said first shaft member, said second shaft member having an axial threaded second socket portion depended within said second shaft member contiguous to and accessed by said counterbored third recess well;

a bolt member having axial threads adapted to form a manually releasable union with said second socket portion, said bolt member having a head-like extension;

a plurality of pushing members symmetrically arranged around the longitudinal axis of said bolt member, said pushing members having parallel interior surfaces which define a longitudinal channel along the interior of said pushing members, said channel embracing said bolt member, each of said pushing members having an arcuately-shaped exterior surface, a tapered shank portion possessing at least one spaced outer surface circumferential channel therein, a first beveled abutment surface which acts against said head-like extension of said bolt member, and a second beveled abutment surface which abuts against said counterbored third recess well;

a spring member mounted within a housing channel disposed transversely within said bolt member, said housing channel intercommunicating the diametrically opposed exteriors of said bolt member, wherein said spring member having a length in excess of said housing channel is permitted to exert a force against said pushing members, said force being directed outwardly from the longitudinal axis of said bolt member; and at least one resilient means, said resilient means being dimensioned to be accommodated within said outer surface channel of said pushing members whereby said pushing members are forcibly, but resiliently, retained against said bolt member;

whereby a displacement of said second shaft member by said first shaft member effects an abutment of said pushing members against said needle bearings, a further displacement of said second shaft member effecting an ejectment of said needle bearings from within said wheel spindle.

* * * * *